(12) United States Patent
Redford et al.

(10) Patent No.: US 9,214,250 B2
(45) Date of Patent: Dec. 15, 2015

(54) POLYMER PARTICLE

(75) Inventors: Keith Redford, Hagan (NO); Helge Kristiansen, Oslo (NO); Heidi Johnsen, Trondheim (NO); Ruth Schmid, Tiller (NO); Justyna Justynska, Aschaffenburg (DE)

(73) Assignee: Conpart AS, Skjetten (NO)

( * ) Notice: Subject to any disclaimer, the term of this patent is extended or adjusted under 35 U.S.C. 154(b) by 206 days.

(21) Appl. No.: 13/882,416

(22) PCT Filed: Oct. 28, 2011

(86) PCT No.: PCT/GB2011/052100
§ 371 (c)(1),
(2), (4) Date: Jul. 10, 2013

(87) PCT Pub. No.: WO2012/056243
PCT Pub. Date: May 3, 2012

(65) Prior Publication Data
US 2013/0277621 A1 Oct. 24, 2013

(30) Foreign Application Priority Data
Oct. 29, 2010 (GB) .................................. 1018379.6

(51) Int. Cl.
| | | |
|---|---|---|
| *H01B 1/02* | (2006.01) | |
| *H01B 1/00* | (2006.01) | |
| *C08L 61/00* | (2006.01) | |
| *C08J 7/00* | (2006.01) | |
| *C08J 9/00* | (2006.01) | |
| *C08J 3/12* | (2006.01) | |
| *C08J 7/04* | (2006.01) | |
| *B29C 71/02* | (2006.01) | |
| *C08J 9/224* | (2006.01) | |

(52) U.S. Cl.
CPC . *H01B 1/00* (2013.01); *C08J 3/128* (2013.01); *C08J 7/047* (2013.01); *C08J 7/08* (2013.01); *C08J 9/0061* (2013.01); *C08J 9/224* (2013.01); *C08L 61/00* (2013.01); *C08J 2325/06* (2013.01); *C08J 2361/00* (2013.01); *C08J 2461/00* (2013.01)

(58) Field of Classification Search
CPC .............. C08L 61/00; C08J 7/00; C08J 9/00; C08J 9/224; C08K 7/22; H01B 1/00; H01B 1/02
USPC ................... 252/512, 500; 528/165; 525/472; 427/123; 428/407
See application file for complete search history.

(56) References Cited

U.S. PATENT DOCUMENTS

| | | |
|---|---|---|
| 4,336,173 A | 6/1982 | Ugelstad |
| 4,459,378 A | 7/1984 | Ugelstad |
| 4,588,617 A | 5/1986 | Oka |
| 4,740,657 A | 4/1988 | Tsukagoshi |
| 4,980,410 A | 12/1990 | Fryd et al. |
| 5,866,202 A | 2/1999 | Nastke et al. |
| 6,562,217 B1 | 5/2003 | Tanaka et al. |
| 6,787,233 B1 | 9/2004 | Molteberg et al. |
| 6,906,427 B2 | 6/2005 | Tanaka et al. |
| 2005/0014001 A1* | 1/2005 | Fonnum et al. ............... 428/403 |
| 2006/0035036 A1 | 2/2006 | Yim et al. |
| 2007/0063347 A1 | 3/2007 | Su |
| 2007/0092698 A1 | 4/2007 | Ishida et al. |
| 2007/0202335 A1 | 8/2007 | Kubota |
| 2008/0078977 A1* | 4/2008 | Hashiba et al. ............... 252/500 |
| 2008/0187755 A1 | 8/2008 | Herfert et al. |
| 2009/0291506 A1* | 11/2009 | Fonnum et al. ................. 436/94 |
| 2010/0063469 A1* | 3/2010 | Herfert .......................... 604/367 |
| 2012/0237447 A1* | 9/2012 | Lee et al. ....................... 424/9.1 |
| 2012/0279781 A1* | 11/2012 | Ozeki et al. ................. 174/84 R |

FOREIGN PATENT DOCUMENTS

| | | |
|---|---|---|
| EP | 0265212 | 4/1988 |
| EP | 1135777 A1 | 9/2001 |
| EP | 2154182 | 2/2010 |
| JP | 61026629 | 5/1986 |
| JP | 61026630 | 5/1986 |
| JP | 05-19241 B * | 3/1993 |
| JP | 06033248 | 8/1994 |
| WO | 9302112 | 2/1993 |
| WO | 9701866 | 1/1997 |
| WO | 0024005 | 4/2000 |
| WO | 0061647 | 10/2000 |
| WO | 2006059825 | 6/2006 |

OTHER PUBLICATIONS

English translation of JP 05-019241, pub. Mar. 16, 1993.*
Restriction Requirement, dated Jul. 23, 2014, received in connection with related U.S. Appl. No. 13/882,377.
International Search Report and Written Opinion, mailed Dec. 28, 2011. 11 pages.
Loeffler, Mario, "Polymer-Core Solder Balls: An Alternative to Solid Solder Balls?", 4 pages, May 23, 2006.
International Search Report and Written Opinion mailed Jan. 31, 2012. 12 pages.
Mijovic et al. "Reaction Kinetics of Epoxy/Amine Model Systems. The Effects of Electrophilicity of Amine Molecule". Macromolecules, 27, pp. 7589-7600. 1994.
Non-Final Office Action for U.S. Appl. No. 13/882,377 issued Oct. 10, 2014.

* cited by examiner

*Primary Examiner* — Douglas McGinty
(74) *Attorney, Agent, or Firm* — Meunier Carlin & Curfman LLC

(57) ABSTRACT

A heat-treated polymer particle comprising an addition polymer core particle which has had swollen and polymerized therein a blend of an aromatic alcohol with an aldehyde or a blend of an aromatic amine or urea with an aldehyde and which has been subsequently heat treated, e.g. to a temperature of at least 150° C.

11 Claims, 1 Drawing Sheet

Figures
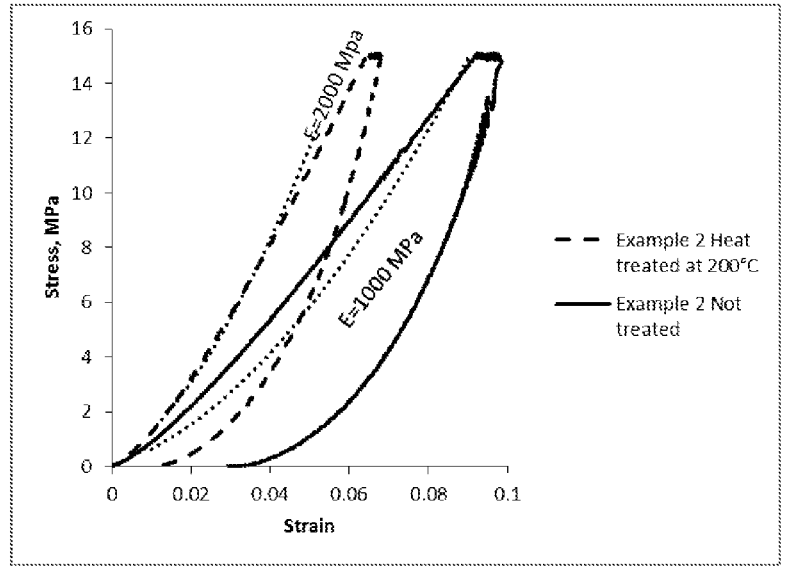
Figure 1. Particles produced in Example 2 tested mechanically in compression using a BOSE ElectroForce 3200 modified with a flat punch.
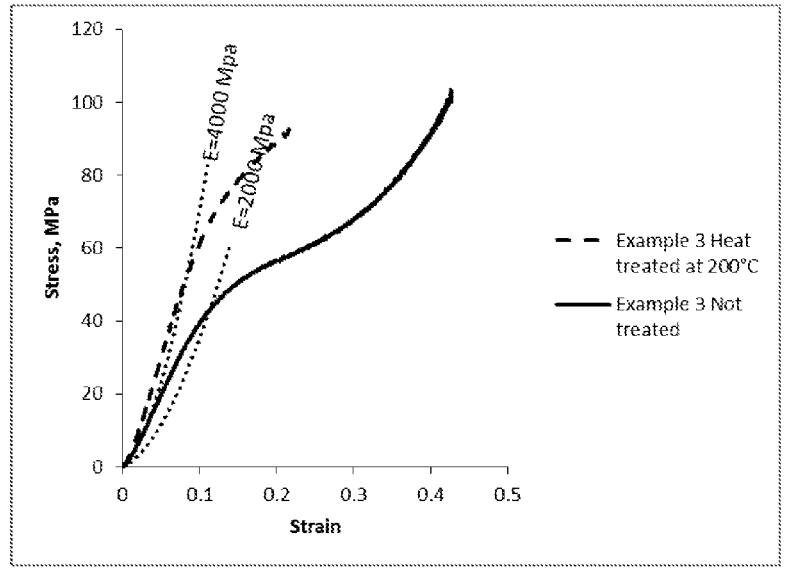
Figure 2. Particles produced in Example 3 tested mechanically in compression using a BOSE ElectroForce 3200 modified with a flat punch

POLYMER PARTICLE

The present invention relates to improved conductive polymer particles suitable for use in electronics applications such as ball grid arrays. In particular, the invention relates to heat treated and/or coated polymer particles which have been swollen using a polymerised aromatic alcohol or aromatic amine or urea and aldehyde mixture. The invention further relates to a process for producing the improved particles hereinafter described.

BACKGROUND

The use of conductive polymer particles in electronics applications is well known. Typically, metal coated polymer beads are positioned between component surfaces and serve to provide electrical connection between those components.

In EP-A-1135777, gold plated polymer microbeads are suggested for use in electrical components. Styrene core particles are palladinated to allow attachment of the gold coating to the particle surface. EP-A-265212 describes gold plated particles with anisotropic conductivity.

U.S. Pat. No. 5,866,202 describes the manufacture of metallised amino resin polymer particles, prepared by acid-catalysed polycondensation and plated using a mixture of electroless and electro plating techniques.

U.S. Pat. No. 6,906,427 relates to conductive particles and methods for their manufacture. The invention described therein relates to the use of various plating methods to obtain a polymer particle with multiple metal layers of low melting point metal. The nature of the polymer particles used is very broadly defined although styrene/divinyl benzene polymers are exemplified.

The present inventors sought to improve upon known conductive particles and have realised that polymer particles swollen with an aromatic compound/aldehyde polymer or urea/aldehyde polymer and which are subsequently optionally heat treated provide an ideal polymer particle for coating and hence for use in electrical components. The heat treated polymer particles have remarkable mechanical properties, especially in terms of one of more of higher elastic (Young's) modulus, lower thermal expansion coefficient, greater deformation before fracture and better thermal resistance. Moreover, the particles swollen with an aromatic compound/aldehyde polymer or urea/aldehyde polymer provide a much better surface for coating upon and hence prevent delamination of the coating from the particle.

A particle with improved properties such as compression resistance, and/or a reduced thermal expansion coefficient has significant applications in the electronics industry, for example in ball grid arrays (BGA), chip-scale packaging (CSP), and conductive adhesives and electronic components in general such as in circuit boards. The problems caused by failure of BGA packages due to fatigue stresses and or reliability issued are discussed, for example, in WO 97/001866 and in M. Loeffler, "Polymer-Core Solder Balls: An Alternative to Solid Solder Balls", CircuiTree (2006) 23 May 2006.

To be used in such applications, particles need to be coated with a conductive material and there is a further need for improvements in the surface adhesion of the polymer core particles to any conductive material in order to prevent delamination and to ensure uniform plating and fewer surface defects in the final particles. The inventors have also realised that treatment of particles with amines before coating improves surface adhesion and provides a much better surface for coating.

The actual polymer particle onto which a coating is applied is not itself new. WO93/02112 describes the production of polymer particles in which a seed particle is, for example, treated with sulphuric acid and swollen with resorcinol and formaldehyde before undergoing a condensation polymerisation to produce a polymer particle.

Whilst therefore the polymer core particles according to the current invention can be prepared using the method of WO 93/02112, no one before has appreciated how valuable these polymers are in conductive particle technology. Moreover, the present inventors have found that heat treatment of these polymer particles surprisingly provides the improved mechanical properties so vital for a useful conductive particle. Finally, the present inventors have realised that surface treatment of the particles provides a surface ideal for coating upon.

SUMMARY OF INVENTION

Thus, viewed from one aspect, the invention comprises a heat-treated polymer particle comprising an addition polymer core particle which has had swollen and polymerised therein a blend of an aromatic alcohol with an aldehyde or a blend of an aromatic amine or urea with an aldehyde and which has been subsequently heat treated, e.g. to a temperature of at least 150° C.

The invention further provides a polymer particle comprising an addition polymer core particle which has had swollen and polymerised therein a blend of an aromatic alcohol and an aldehyde or a blend of an aromatic amine or urea with an aldehyde and which has been subsequently coated, preferably heat-treated and coated, with at least one layer comprising a metal.

Viewed from another aspect the invention provides a polymer particle comprising an addition polymer core particle which has had swollen and polymerised therein a blend of an aromatic alcohol and an aldehyde or a blend of an aromatic amine or urea with an aldehyde and which has been subsequently treated with an amine, preferably heat treated and treated with an amine.

Viewed from another aspect the invention provides a polymer particle comprising an addition polymer core particle which has had swollen and polymerised therein a blend of an aromatic alcohol and an aldehyde or a blend of an aromatic amine or urea with an aldehyde and which has been subsequently treated with an amine and subsequently coated with at least one layer comprising a metal, especially preferably heat treated, treated with an amine and subsequently coated with at least one layer comprising a metal or treated with an amine, heat treated and subsequently coated with at least one layer comprising a metal.

Viewed from another aspect, the invention provides a process for the preparation of a heat-treated polymer particle comprising heat-treating an addition polymer core particle which has had swollen and polymerised therein a blend of an aromatic alcohol and an aldehyde or a blend of an aromatic amine or urea and an aldehyde at a temperature above 150° C., preferably above 200° C., more preferably between 200 and 250° C.

Viewed from another aspect, the invention provides a process for the preparation of a coated polymer particle comprising coating an addition polymer core polymer particle which has had swollen and polymerised therein a blend of an aromatic alcohol and an aldehyde or a blend of an aromatic amine or urea with an aldehyde with at least one metal layer.

Viewed from another aspect, the invention provides a process for the preparation of a heat-treated coated polymer particle comprising heat-treating an addition polymer core particle which has had swollen and polymerised therein a blend of an aromatic alcohol and an aldehyde or a blend of an aromatic amine or urea with an aldehyde at a temperature above 150° C. and subsequently coating with at least one metal layer.

Viewed from another aspect, the invention provides a process for the preparation of a surface treated polymer particle comprising treating an addition polymer core particle which has had swollen and polymerised therein a blend of an aromatic alcohol and an aldehyde or a blend of an amine with an aldehyde with an amine.

Viewed from another aspect, the invention provides a process for the preparation of a heat-treated polymer particle comprising heat-treating an addition polymer core particle which has had swollen and polymerised therein a blend of an aromatic alcohol and an aldehyde or a blend of an aromatic amine or urea with an aldehyde at a temperature above 150° C. and subsequently treating with an amine. The heat-treatment and amine-treatment steps may be performed in reverse order, i.e. amine-treatment followed by heat-treatment.

Viewed from another aspect, the invention provides a process for the preparation of a heat-treated polymer particle comprising heat-treating an addition polymer core particle which has had swollen and polymerised therein a blend of an aromatic alcohol and an aldehyde or a blend of an aromatic amine or urea with an aldehyde at a temperature above 150° C., subsequently treating with an amine and subsequently coating with at least one metal layer. Again, the heat-treatment and amine-treatment steps may be performed in reverse order, i.e. amine-treatment followed by heat-treatment.

In another aspect, the invention provides a particle obtainable by the processes according to the invention.

In yet another aspect, the invention provides a ball grid array (BGA), chip-scale packaging (CSP), or conductive adhesive and/or other electronic circuit part comprising the coated particles of the invention and/or coated particles obtainable by the process of the invention.

Viewed from another aspect the invention provides the use of a coated polymer particle as hereinbefore defined in an electronic part.

DEFINITIONS

The term addition polymer is used herein to describe polymers and copolymers of monomers including vinyl, styrenic and acrylic esters polymerised by free radical, anionic or cationic polymerisation.

The term seed particle is used herein to define the polymer particle before the aromatic compound/aldehyde or urea/aldehyde mixture is swollen into the seed and polymerised.

The term core particle is used herein to define a seed which has had swollen and polymerised therein the aromatic compound/aldehyde mixture or urea/aldehyde mixture but which has not yet been further treated or coated.

A functionalised seed particle is a seed particle which has within it an ionisable group such as an acid or amine. Such a seed is ideal for having swollen and polymerised therein the aromatic compound/aldehyde mixture or urea/aldehyde mixture.

The term monodisperse is used herein to describe particles with a low variation in size. A monodisperse size distribution would have a coefficient of variation (CV) of less than 10% and preferably less than 5%. CV is defined as standard deviation/mean size.

The term polydisperse is used herein to describe particles with a high variation in size: A size distribution described with a CV of greater than 10%

DETAILED DESCRIPTION OF THE INVENTION

In order to manufacture the heat treated, surface treated and/or conductive particles of the invention a seed particle is needed. Such a seed particle is readily available and can be manufactured by known techniques such as emulsion polymerisation, dispersion polymerisation and suspension polymerisation. These techniques are well known in the art. It is especially preferred if an Ugelstad activated swelling technique is employed to manufacture the seed particles. The Ugelstad process is an "activated swelling" process rather than a suspension polymerization because polymerization is only initiated after all the monomer has been absorbed into the starting polymer seeds. In a seeded suspension polymerization the growing seed is continuously contacted with fresh monomer and initiator.

The Ugelstad (Sintef) process is described in U.S. Pat. No. 4,336,173 and U.S. Pat. No. 4,459,378 although seeds can also simply be bought from suppliers. Lightly crosslinked monodisperse polymer particles produced by the Sintef process are sold commercially under the trade name Dynospheres®, typically with mode particle sizes in the range 0.5 to 200 μm. It is preferred if the seed particle used in this invention is monodisperse.

In general therefore, this seed technology is well known and seeds can be purchased commercially from the likes of Invitrogen Dynal ASA.

Less preferably, the initial polymer seed material may be produced by a process which yields a polydisperse product, e.g. a conventional suspension polymerization process, with the polydisperse product then being size separated to yield a substantially monodisperse particle population.

The seed particles can be formed from a variety of different monomers. It will be preferred if the seed particle is also cross-linked. Typically, most of the monomers used will be monofunctional unsaturated monomers, and crosslinking of the seed particles is obtained by using a small amount of polyfunctional unsaturated monomer. The amount of crosslinker, e.g. polyfunctional unsaturated monomer, which may be used in the present invention, is conveniently in the range 0.01 to 3% based upon the total weight of monomers.

The terms "monofunctional unsaturated monomer" and "polyfunctional unsaturated monomer" are used herein to describe a monomer containing
a) one and
b) two or more polymerizable double bonds respectively.

Seed particles may, for example, be prepared from styrene, e.g. styrene crosslinked with divinylbenzene. Other styrene monomers of use in the invention include methylstyrene and vinyl toluene. Mixtures of styrene monomers may be used.

Another option is seed particles prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above. All monomers can be crosslinked with divinylbenzene or a diacrylic monomer such as ethane-diol-diacrylate. Some seeds may require treatment with base to hydrolyse ester groups to allow cross-linking. The use of a cross-linking agent and hence the formation of a cross-linked seed is preferred.

Still another method for preparing seed particles involves copolymerization of mixed anhydrides such as acrylic acidacetic acid anhydride, or maleic and/or fumaric anhydride with styrene, and a small amount of divinylbenzene, and finally hydrolyzing the product. Some seed monomers may comprise epoxy groups such as glycidol methacrylate. The skilled man is able to select the monomer combination and cross-linker he wants using his general knowledge.

Preferred polymer seed particles according to the invention comprise a styrene, an acrylate or a methacrylate seed. Highly preferred monomers therefore include styrene, acrylic acid, butyl acrylate, 2-ethylhexyl acrylate, methyl acrylate, ethyl acrylate, acrylonitrile, methyl methacrylate and trimethylolpropane triacrylate (TMPTA)

Most preferably, the seed particles comprise a styrene divinyl benzene. The most preferred seed particle is a styrene/divinyl benzene sulphonated with $H_2SO_4$ The seed particles tend to have diameters around 0.5 to 200 μm. A seed particle of 0.5 μm diameter will give a functionalised particle of approximate diameter 3 μm. A seed particle of 200 μm will give a final particle of approximate diameter 1 mm.

It is highly preferred if this seed polymer particle is functionalised. By functionalised is meant that an ionisable group is introduced into the polymer seed. This ionisable group may be present as part of the monomer used to form the seed or it may be introduced by post treatment of the seed.

Thus, ionisable groups may be introduced through the monomer used for seed preparation, and if necessary these groups may be temporarily protected during seed formation. The use of esters for example allows the formation of carboxylic acids upon ester hydrolysis. The use of acrylic acids provides an ionisable carboxyl group in the polymer seed.

Alternatively, a seed particle can be contacted with an external agent such as acid or a base to introduce ionisable groups. Suitable external agents include phosphoric acid or sulphuric acid.

Suitable ionisable groups include acid groups such as sulphonic acid groups, phosphonic acid groups or carboxylic acid groups. Basic groups include tertiary amines or quaternary ammonium hydroxides, and salts of these acids and bases. WO93/02112 describes this process in detail. Typically, a seed particle can be contacted with the external agent at elevated temperature before being cooled and washed with water.

The introduction of an ionisable group provides a hydrophilic environment making seeds water swellable and also able to absorb the monomers discussed below. Moreover, these groups serve to catalyse the polymerisation of the aromatic compound or urea and aldehyde monomer within the polymer seed as described below.

The functionalised seed particles tend to have diameters around 3 μm to 1 mm in diameter and are swelled relative to the seed particle, i.e. have an increased diameter.

The polymer seeds, preferably functionalised polymer seeds, must then be swollen with monomers and those monomers polymerized within the seed so as to form the core particles of the invention which are then suitable for heat treatment, surface treatment and coating. Suitable polymer core particles comprise an addition polymer seed swelled with an aromatic alcohol/aldehyde blend such as a phenol/formaldehyde, or an addition polymer seed swelled with an aromatic amine/aldehyde blend such as melamine/formaldehyde and wherein the monomers are polymerised within the seed. The use of urea/aldehyde blends is also contemplated.

The aldehyde of use in the invention is preferably a $C_{1-6}$ alkanal, or furfural, especially a $C_{1-4}$-alkanal. The seed is preferably swelled with an aromatic alcohol compound in combination with a formaldehyde or with an aromatic amine or urea in combination with formaldehyde.

The term aromatic alcohol is used herein to describe either an aryl compound or heteroaryl compound containing at least one heteroatom selected from N, O or S, said compound having one or more hydroxyl groups directly attached to the aryl or heteroaryl ring. It is preferred if the aromatic group is 5 or 6-membered in the ring. Preferred aryl groups include $C_{6-10}$ aryl groups, especially those containing a benzene ring. More preferred aromatic alcohols include phenol, resorcinol and cresol.

Heteroaryl groups of particular interest include 5 or 6 membered nitrogen heterocycles or 5 or 6 membered oxygen heterocycles. Suitable heteroaryl alcohols include furfuryl.

Any aromatic alcohol can have one or more hydroxyl groups, e.g. 1 to 3, especially 1 or 2 hydroxyl groups. At least one hydroxy group must be directly attached to the aryl or heteroaryl ring, preferably all hydroxyls.

The term aromatic amine is used herein to cover either an aryl compound or heteroaryl compound containing at least one heteroatom selected from N, O or S, said compound having one or more amine groups directly attached to the aryl or heteroaryl ring. It is preferred if the aromatic group is 5 or 6-membered in the ring. Preferred aryl groups include $C_{6-10}$ aryl groups, especially those containing a benzene ring.

Any aromatic amine can have one or more amino groups, e.g. 1 to 3, especially 1 or 2 amino groups. A linear amine can have many amine groups.

Preferred aryl amine compounds include aniline or diaminobenzene.

Heteroaryl groups of particular interest include 5 or 6 membered nitrogen heterocycles or 5 or 6 membered oxygen heterocycles. Preferred heteroaryl amine compounds are melamine. The use of melamine/formaldehyde is preferred.

A further option is the combination of urea and an aldehyde, especially urea and formaldehyde.

Most preferably the seed particles are swollen with resorcinol formaldehyde polymers.

It is preferred if the aldehyde component is in excess in the swollen particle or that the stoichiometry is around 1:1

The swelling process typically involves adding the seed particles to a solution of the aromatic and aldehyde monomers, often an aqueous solution, to allow swelling to occur.

Once swollen with these compounds, a polymerisation is effected within the seed particle. The volume of the final polymer particle is many times that of the original seed particle. The diameter of core particles can therefore be typically 5 times that of the original seed. The polymerisation reaction is achieved simply by heating the particle. The temperature employed is typically around 60 to 80° C. Polymerisation may be carried out using an autoclave, which has the advantage of preventing loss of components. Typical temperatures in autoclave heating may be in the range 60 to over 100° C. As noted above, the ionisable groups within the seed catalyse this polymerisation process.

It will be appreciated therefore that the aldehyde/aromatic compound or urea will react with each other to form a polymer and hence what is contained within the particle is really a polymer thereof. Monomer that is outside the particle will not be exposed to the catalyst.

It is highly preferred if a styrene/divinylbenzene seed particle is employed, the ionisable groups present are sulphonic acids groups and a resorcinol formaldehyde or melamine formaldehyde polymer is polymerised in the seed.

These polymer core particles are described in WO93/02112 which is herein incorporated by reference.

Heat Treatment

The present inventors have surprisingly found that for the best possible mechanical properties, it is preferred to heat treat the polymer core particles at this point. The present inventors have surprisingly found that by heat-treating these polymer core particles the mechanical properties of the particle are improved. Without wishing to be limited by theory, it is believed that the polymer core particles are not completely cross-linked at this stage in the process. Heat treatment it is predicted improves the cross-linking degree and removes some of the low molecular components that may plasticise the polymer. It must be noted that the heat treatment step of the invention takes place at a higher temperature, e.g. at least 10° C. higher than the temperature used to effect the polymerisation of the aromatic compound/urea and the aldehyde.

After heat treatment, the heat-treated polymer particles according to the current invention have lower thermal expansion coefficients. Moreover, the core particles have higher elastic modulus. Thus, heat treated particles of the invention may have a thermal expansion coefficient in the range 15 to $30 \times 10^{-6}$/K, for example 20 to $25 \times 10^{-6}$/K. This is important as electronic parts can get very hot in operation and there can be mismatches in expansion between adjacent parts or components. It is obviously vital that parts of the electronic mechanism do not degrade at higher temperatures. It is envisaged that the thermal expansion coefficient of a heat treated particle can be reduced by 10%, especially by more than 15% than the thermal expansion coefficient of an otherwise identical non heat-treated particle.

The elastic modulus of the heat treated particles may vary considerably dependant on the molar ratio of the components. It is envisaged that the elastic modulus of a heat treated particle can be more than 50% higher than, especially more than double that of the elastic modulus of an otherwise identical non heat treated particle. The elastic recovery of the particle may be improved compared with the non-heat treated particle. This is important as in an electronic part, the particle of the invention typically forms a connection between a part and a substrate. It acts therefore as a support for the part. Improved elastic properties means the particle is more able to resist compression and more able to spring back to its original form. The particles are more resilient.

The particles of the invention may also possess greater deformation before fracture. The particles can be compressed more without fracturing.

The polymer particles are heat treated by heating to a temperature above 150° C., e.g. at least 180° C. Preferably the heat treatment temperature is in the range 150 to 400° C., such as 160° C. to 350° C., more preferably 175 to 300° C., such as 180 to 250° C. This has the effect of improving the mechanical properties of the particles in comparison with particles which are not heat-treated. The heat treatment step can be carried out in an inert atmosphere, especially if heat treatment takes place at a temperature of more than 250° C., but is preferably conducted in air. The heat treatment step can be very short, as the benefits of the invention are believed to be felt rapidly. The dwell time at the high temperature may last for as little as 1 second. It will be important of course, to ensure that when heating a plurality of particles that these are all exposed to the necessary heat.

The heat-treated polymer particles according to the invention preferably have a diameter in the range of 3 μm to 1000 μm, preferably 100-800 μm, more preferably 250-800 μm.

One of the advantages of the invention is the uniformity in particle size. Our particles are preferably monodisperse. By monodisperse is meant that for a plurality of particles (e.g. at least 100, more preferably at least 1000) the particles have a coefficient of variation (CV) of less than 10%, for example less than 5%, preferably less than 2%, more preferably less than 1%. CV is determined in percentage as $$CV = \frac{100 \times \text{standard deviation}}{\text{mean}}$$

where mean is the mean particle diameter and standard deviation is the standard deviation in particle size.

The heat treated particles are therefore preferably monodisperse.

Particle Coating

As noted above, this invention primarily relates to conductive particles. These are particles which are functionalised to carry a conductive coating such as a metal coating on their surface. One of the problems of prior art polymer particles has been adhesion of a coating layer to the surface of polymer particles. Metal based coatings do not adhere well to a hydrophobic, organic particle surfaces.

The present inventors have surprisingly found that the aldehyde/aromatic compound or urea swollen particles of this invention provide an ideal support for metal based coatings. Even more preferably, the particle to be coated is heat treated as discussed above.

Both the non heat-treated or heat-treated polymer core particle can be coated by methods known in the art. Thus the invention further provides a coated, preferably heat-treated polymer particle.

The coating comprises at least one conductive material, in particular a metal. The metal is preferably one from the transition metal series or a metal such as Bi, Si, Sb, Sn, Pb, Ga, Ge, In or Al. Preferably, the metal is a low melting point metal (e.g. less than 500° C.). Metals of particular interest include gold, chromium, bismuth, indium, zinc, antimony and nickel. Especially preferably the metal may be selected from Cu, Sn and Ag.

Any mixtures of the above metals may also be used. In particular a lead free solder may be employed in one or more layers of the coating. Lead free solders in commercial use may contain tin, copper, silver, bismuth, indium, zinc, antimony, and traces of other metals. Sn—Ag—Cu solders are especially preferred.

The metal can be provided to the polymer particle as the metal element or as part of a compound, in particular as a salt of the metal such as a halide and especially an oxide thereof. The metal itself is often formed during the actual coating procedure.

Preferably the thickness of any coating layer is in the range 50 nm to 30 microns. The total thickness of any coating layers may be 50 nm to 60 microns.

It is preferred if lead compounds are avoided in the coating.

The non heat-treated polymer core particle or the heat-treated core particle can be coated according to methods known in the art. Such methods include electroplating, electroless plating, barrel coating, sputtering and vapour deposition. Mixtures of these methods may also be employed, see for example WO 97/001866.

The coating provided on the particle can be monolayer or multilayer and comprises at least one metal layer. Preferably the particle comprises a plurality of metal layers. Where multiple coating layers are present it is within the scope of the invention for different coating application methods to be involved in the formation of each layer. In particular, it is preferred if a first layer is introduced using vapour deposition, sputtering or electroless plating and a second layer (and optionally further layers) introduced using electroplating. Optionally a final top layer may be added using electroless plating.

Electroless plating is a method of depositing a metal on to a substrate using a process of chemical reduction. The advantage of this type of deposit is that the coating is uniform with hardly any variance in the distribution of thickness across the component.

It may be beneficial to heat-treat the as-deposited electroless plated coating to improve hardness.

Electroplating is a plating process that uses electrical current to reduce cations of a desired metal from a solution and coat an object with a thin layer of the metal. Electroplating can be used to build up coating thickness on a conducting base layer.

In a multilayer coating, it is preferred if the layer adjacent the actual polymer particle comprises copper, Ni or silver, especially silver. This layer is preferably applied by vapour deposition, sputtering or electroless coating. It is preferred if the top layer comprises Ag or Sn, in particular comprises lead free solder. The top layer is preferably one that resists oxidation. The most preferred top layer is Ag, e.g. having a thickness in the range 25-200 nm. Any middle layers preferably comprise copper. It is obviously beneficial to use as much low-cost metal and as little expensive metal as possible.

It will be appreciated that the coating may comprise standard additives such as surface antioxidants if necessary.

As noted above, the aromatic compound or urea/aldehyde swollen particles of the invention are ideal for use in combination with a conductive coating as they provide excellent mechanical properties as well as a much better surface for coating adhesion than the prior art particles.

The polymer particle may however be further treated to improve surface adhesion still further.

Surface Treatment

Before coating therefore, the particle of the invention may be contacted with an amine compound, preferably a diamine compound, most preferably a polyamine compound in order to provide a polymer particle surface with even better adhesion. Amine compounds of use in this aspect are preferably diamines or polyamines e.g. having up to 10 carbon atoms. Preferably alkyl amines are used, e.g. those containing up to 10 carbon atoms and up to 6 amino groups. Amino groups can be pendant or within the compound backbone. Amino groups are preferably primary or secondary. Ideally, the amino functionality is the only functional group present (i.e. the molecule is otherwise C and H).

The compounds may be linear, branched or cyclic. The use of ethylene diamine, triethylenetetramine or tetraethylene pentamine is preferred. This is conveniently provided in solution, e.g. aqueous solution or ethylene glycol solution. For example, a water:ethyleneglycol mixture can be used.

In theory, surface treatment could also be effected using a thiol, dithiol or polythiol compound following exactly the same principles.

Surface treatment can be carried out on non heat treated core particles or heat treated particles. Non heat treated particles that are surface coated can be subsequently heat treated. Any resulting particle can then be coated using the principles above.

In a most preferred embodiment a heat treated, surface treated, coated particle (or a surface treated, heat treated, coated particle) is used.

The particles of the invention are preferably free flowing, i.e. they do not aggregate in any way.

At all stages of the process, i.e. after heat treatment, surface treatment or coating, the polymer particles of the invention are preferably monodisperse.

The surface-treated polymer particles according to the invention preferably have a diameter in the range of 3 µm to 1000 µm, preferably 100-800 µm, more preferably 250-800 µm.

Applications

The particles of the invention have obvious applications in electronics. The invention therefore provides an electronic circuit element bound to a substrate using at least one coated particle of the invention. In particular, the invention relates to their use in ball grid arrays (BGA), Chip scale Packaging (CSP) and conductive adhesives. Thus the invention also encompasses a Ball Grid Array or electronic circuit part comprising the coated particles according to the invention.

The particles of the invention can also be employed wherever a conductive particle might be desired.

The invention is illustrated by the following examples.

DESCRIPTION OF THE FIGURES

FIG. 1 shows particles produced in Example 2 tested mechanically in compression using a BOSE ElectroForce 3200 with a flat punch.

FIG. 2 shows particles produced in Example 3 tested mechanically in compression using a BOSE ElectroForce 3200 modified with a flat punch

EXAMPLES

Example 1

Sulphonation of 55 µm Monosized Polystyrene Particles

Monosized (55 µm) polystyrene particles cross linked with 0.1 weight percent divinylbenzene were prepared by the activated swelling method of Ugelstad. In a sealed reactor 90 ml of 1,2-dichloroethane was added to 6.5 g dry particles. After 48 hours 390 g of concentrated sulphuric acid was added and the particle dispersion was stirred at 90° C. for 24 hours. The dispersion was cooled down to room temperature and carefully poured into 3 liter of water. The particles were washed on a filter by continuously pouring water through the dispersion, until the washing water had a pH of approx. 6. The obtained final dispersion had a solid content of 0.52% and comprised swollen monosized sulphonated particles of diameter 345 µm.

Example 2

Preparation of Resorcinol-Formaldehyde Particles

To 19.23 g of the dispersion of sulphonated monosized particles from example 1 containing 0.1 g dry particles was added 480 g of water, 13.33 g of resorcinol and 29.48 g of 37% formaldehyde solution. The mixture was heated at 65° C. under stirring for 2 hours to give monosized resorcinol-formaldehyde particles of size 332 µm. The particles were sedimented and redispersed in water several times until the water phase was free of fines. Finally the particles were dried in air at room temperature. They were red-brown in colour and were designated as not heat treated. A sample of particles was heat treated at 200° C. for 2 hours. These particles are designated as heat treated at 200° C.

The particles produced were tested mechanically in compression using a Hysitron Tryboindenter modified with a flat punch. The results are shown in FIG. 1. For ease of interpretation two lines are included showing the calculated performance of particles with a modulus of 1000 MPa and 2000 MPa. The calculated lines are from the method of Zhang, Kristiansen and Liu. Computational Materials Science 39 305-314 (2007). The calculated lines compensate for the effects of geometry: compression of a spherical particle. This test involves first loading the particle in compression 20 seconds, holding maximum deformation for 5 seconds and thereafter removing the load and following the recovery. The recovery is followed over 15 seconds It is important to note the hysteresis curve of the heat treated particles shows a rapid return to almost the spherical shape (even considering that the recovery is only followed over a short time—15 seconds). The recovery after heat treatment is clearly improved.

Example 3

Preparation of Resorcinol-Acetaldehyde Particles

To 19.23 g of the dispersion of sulphonated monosized particles from example 1 containing 0.1 g dry particles was added 66 g of water, 8.90 g of resorcinol and 10.68 g of acetaldehyde. The mixture was heated at 65° C. under stirring for 4 hours to give monosized resorcinol-acetaldehyde particles of size 280 Finally the particles were dried in air at room temperature. The particles were sedimented and redispersed in water several times until the water phase was free of fines. Finally the particles were dried in air at room temperature. They were dark brown in colour and were designated as not heat treated. A sample of particles was heat treated at 200° C. for 2 hours. These particles are designated as heat treated at 200° C.

The particles produced were tested mechanically in compression using a Hysitron Tryboindenter modified with a flat punch. The results are presented in FIG. 2. For ease of interpretation two lines are included showing the calculated performance of particles with a modulus of 2000 MPa and 4000 MPa. The calculated lines are from the method of Zhang, Kristiansen and Liu. Computational Materials Science 39 305-314 (2007). The calculated lines compensate for the effects of geometry: compression of a spherical particle.

Example 4

Thermal Expansion of Resorcinol-Formaldehyde Particles

A Perkin Elmer TGA7 was used to heat treat the particles produced in example 2 for a predetermined time in an atmosphere of dry nitrogen. The resultant particles were subsequently tested in a Perkin Elmer TMA7 to determine the coefficient of thermal expansion, shown in Table 1.

TABLE 1

Comparative thermal expansion coefficients.

| Sample | Thermal treatment | Measurement range | Coefficient thermal expansion |
|---|---|---|---|
| Resorcinol formaldehyde | Dried at 60° C. | 100 to 140° C. | $25.5 \times 10^{-6}$/K |
| Resorcinol formaldehyde | 200° C. 2 hours | 100 to 140° C. | $21.5 \times 10^{-6}$/K |

Example 5

Resorcinol Formaldehyde Particles Heat Treated and Surface Treated with Tetraethylenepentamine The monodisperse polymer spheres supplied by Conpart AS (Oslo, Norway) with modal diameters of 380 µm composed of resorcinol formaldehyde were produced after the method described in WO 93/02112 and WO 00/61647.

200 g of polymer particles were heated to 200° C. for 2 hours in air. The particles were cooled to room temperature.

100 g of the heat treated polymer particles with nominal diameter 380 micrometer were dispersed in a mixture of 125 ml MilliQ water, 124 ml ethylene glycol, and 74 ml tetraethylenepentamine. The mixture was heated to and held at 105° C. for 24 hours. The particles were cooled and washed with Milli-Q water.

Example 6

Metal Coating of Resorcinol Formaldehyde Particles Heat Treated and Surface Treated with Tetraethylenepentamine The particles from example 5 were redispersed in 1200 ml water and 600 mg tetrachloropalladate added. The particles were heated to 60° C. The particles were washed with Milli-Q water once then redispersed in milli-Q water and heated to 60° C. 1500 mg dimethylaminoborane were added. The particles were stirred for 20 minutes before washing three times with Milli-Q water.

27.5 g of particles (with added catalyst) were added to a mixture of 1500 ml Milli-Q water, 45 g Polyvinylpyrrolidone, and 15 g nickel chloride hexahydrate. 28.4 ml 25% ammonia solution was added. Under rapid agitation 37 ml of a 100 mg/ml solution of dimethylaminoborane was added.

The particles resultant particles were evenly coated with a layer of Nickel showing good adhesion. The thickness of the coating was nominally 1 micrometer.

The particles produced above were barrel-plated with copper using the commercial system "Copper Gleam" of Rohm & Haas, supplied by Candor AB, Sweden. The plating was performed with a total 59.2 Amp·hours yielding a nominal thickness of 17.1 micrometer copper. The resultant product showed 100% coverage with an even thickness of copper and good adhesion between copper and the underlying Nickel layer.

Example 7

Resorcinol Formaldehyde Particles, Heat Treated and Surface Coated with Electroless Silver The monodisperse polymer spheres supplied by Conpart AS (Oslo, Norway) with modal diameters of 390 µm composed of Resorcinol formaldehyde were produced after the method described in WO 93/02112 and WO 00/61647.

200 g of polymer particles were heated to 200° C. for 2 hour in air. The particles were cooled to room temperature 100 g of the heat treated polymer particles with nominal diameter 390 micrometer were dispersed in a mixture of 175 ml MilliQ water, 125 ml ethylene glycol, and 75 ml tetraethylenepentamine. The mixture was heated to and held at 103° C. for 24.5 hours. The particles were cooled and washed with Milli-Q water. The particles were dried.

2.4 g particles were dispersed in 240 ml Milli-Q water and 120 mg tetrachloropalladate added. The particles were heated to 60° C. The particles were stirred for 30 minutes. The particles were washed with Milli-Q water once then redispersed in 70 ml milli-Q water and heated to 60° C. 300 mg dimethylaminoborane were added. The particles were stirred for 30 minutes before washing three times with Milli-Q water. The particles were dried at 60° C. for 14 hours.

A mixture of 85 ml Milli-Q water containing 0.24 g silver nitrate, 5.8 ml triethylenetetramine was warmed to 60° C. 2 g of the particles with added catalyst was added and stirred for 1 hour. 0.5 g ascorbic acid was added. The suspension of particles was stirred for 55 minutes. The product was washed 3 times in Milli-Q water and once in methanol. The product was dried for 10 hours at 60° C.

The product was 100% coated with silver with no apparent material not adhered to the particle.

Example 8

Heat Treated Resorcinol Formaldehyde Particles Coated with Electroless Silver 5 g heat treated particles from example 7 were dispersed in 60 ml Milli-Q water and 30 mg tetrachloropalladate added. The particles were heated to 60° C. The particles were stirred for 25 minutes. The particles were washed with Milli-Q water once then redispersed in 50 ml milli-Q water and heated to 60° C. 75 mg dimethylaminoborane were added. The particles were stirred for 20 minutes before washing three times with Milli-Q water. The particles were dried at 60° C. for 6 hours.

A mixture of 30 ml Milli-Q water containing 0.1 g silver nitrate, 2.35 ml triethylenetetramine was warmed to 60° C. 1 g of the particles with added catalyst was added and stirred for 1 hour. 0.2 g ascorbic acid was added. The suspension of particles was stirred for 30 minutes. The product was washed 3 times in Milli-Q water and once in methanol. The product was dried for 5 hours at 80° C.

The product was covered with silver (estimated 70% coverage).

The invention claimed is:

1. A heat-treated polymer particle, comprising: an addition polymer core particle, which has had swollen and polymerized therein a blend of an aromatic alcohol with an aldehyde or a blend of an aromatic amine or urea with an aldehyde, and which has been heat treated to a temperature of at least 150° C., and which has subsequently been:
    coated with at least one layer comprising a metal; or
    treated with an amine.

2. The polymer particle of claim 1, wherein the heat-treated polymer particle has been treated with an amine and is subsequently coated with at least one layer comprising a metal.

3. A process for the preparation of a heat-treated polymer particle, comprising:
    heat-treating an addition polymer core particle, which has had swollen and polymerized therein a blend of an aromatic alcohol and an aldehyde or a blend of an aromatic amine or urea and an aldehyde, at a temperature above 150° C., thereby forming a heat-treated polymer particle; and
    coating the heat-treated polymer particle with at least one layer comprising a metal; or
    treating the heat-treated polymer particle with an amine.

4. The process of claim 3, further comprising coating the heat-treated polymer particle that has been treated with an amine with at least one metal layer.

5. A particle obtainable by a process according of claim 3.

6. The polymer particle of claim 1, wherein the aldehyde is formaldehyde.

7. The polymer particle of claim 1, wherein the aromatic alcohol is resorcinol.

8. The polymer particle of claim 1, wherein the core particle comprises styrene divinyl benzene.

9. The polymer particle of claim 1, wherein the metal is Cu, Sn or Ag.

10. The polymer particle of claim 1, wherein the amine is a diamine or polyamine.

11. The polymer particle of claim 1, wherein the amine is ethylene diamine, triethylene tetramine or tetraethylene pentamine.

* * * * *